United States Patent Office 3,520,206
Patented July 14, 1970

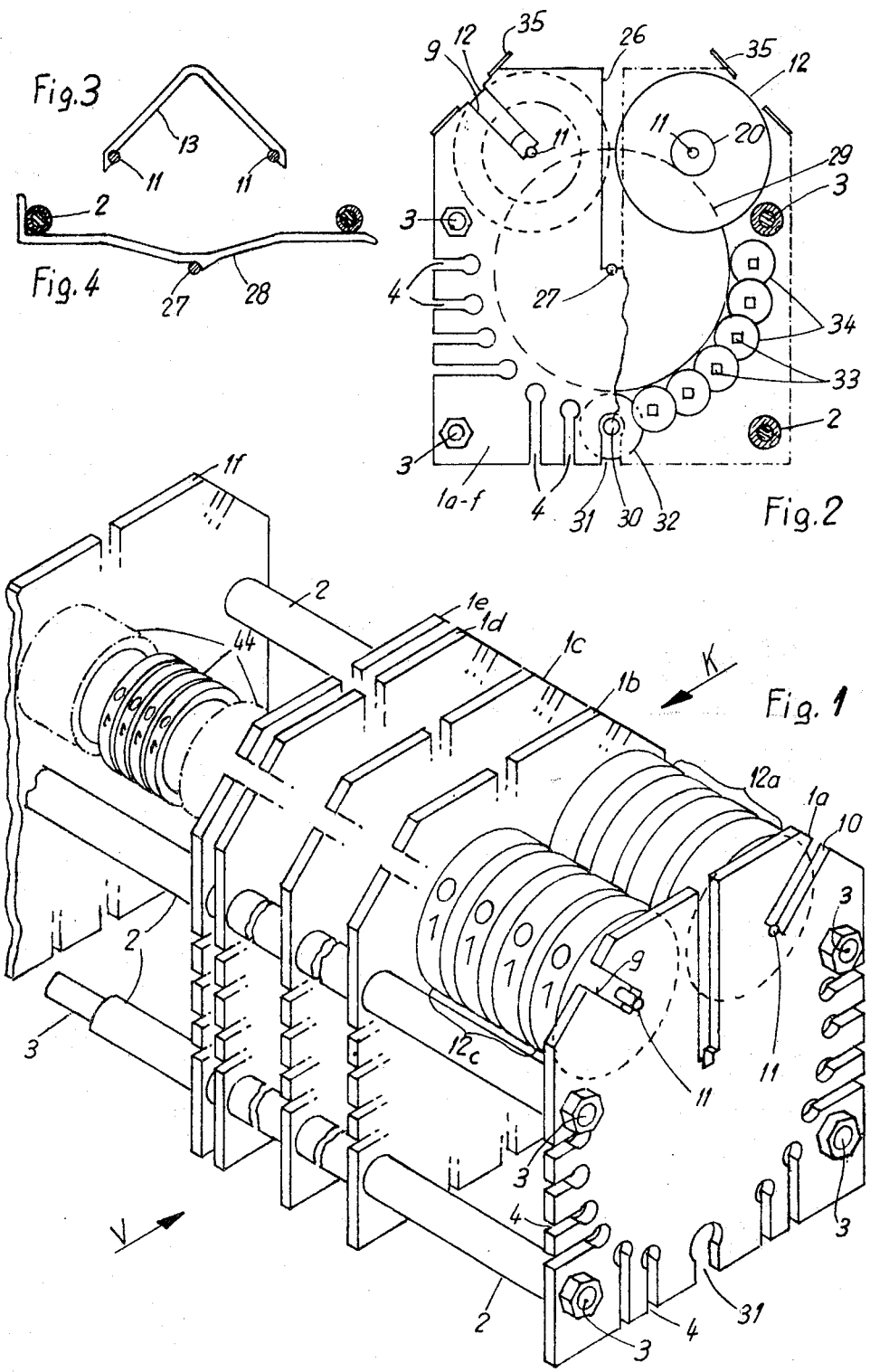

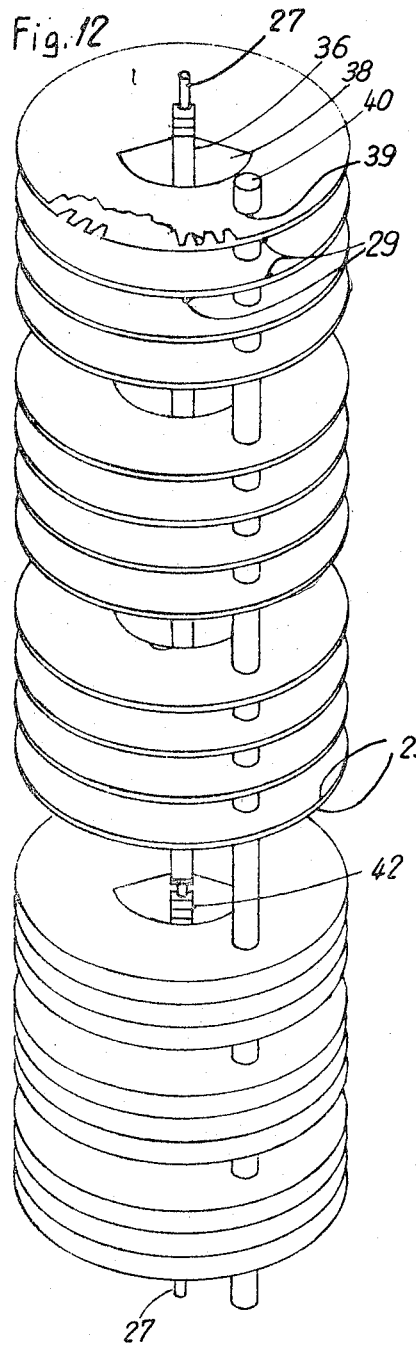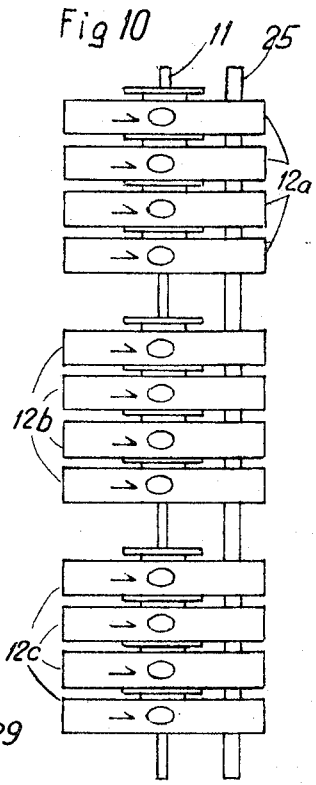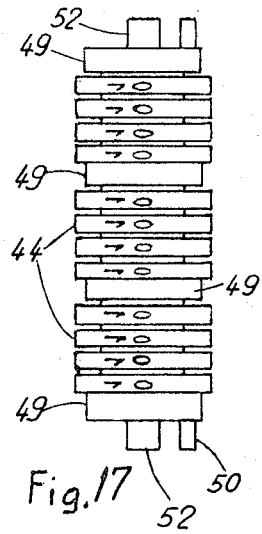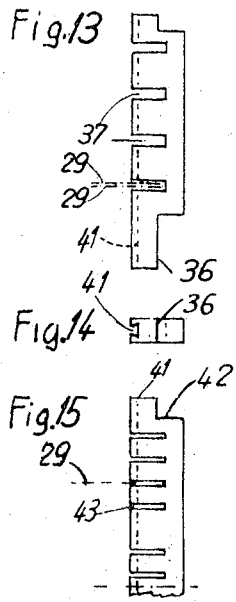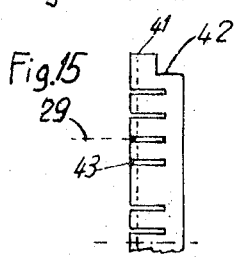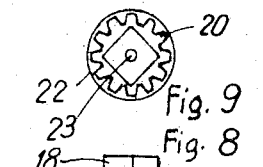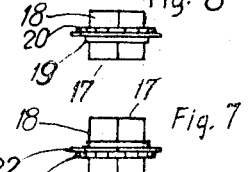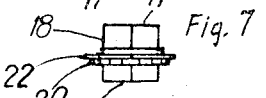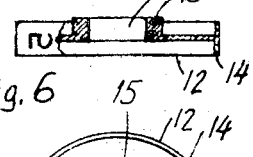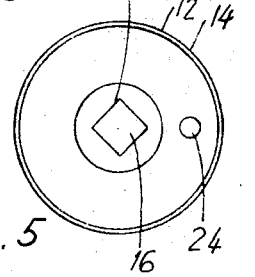

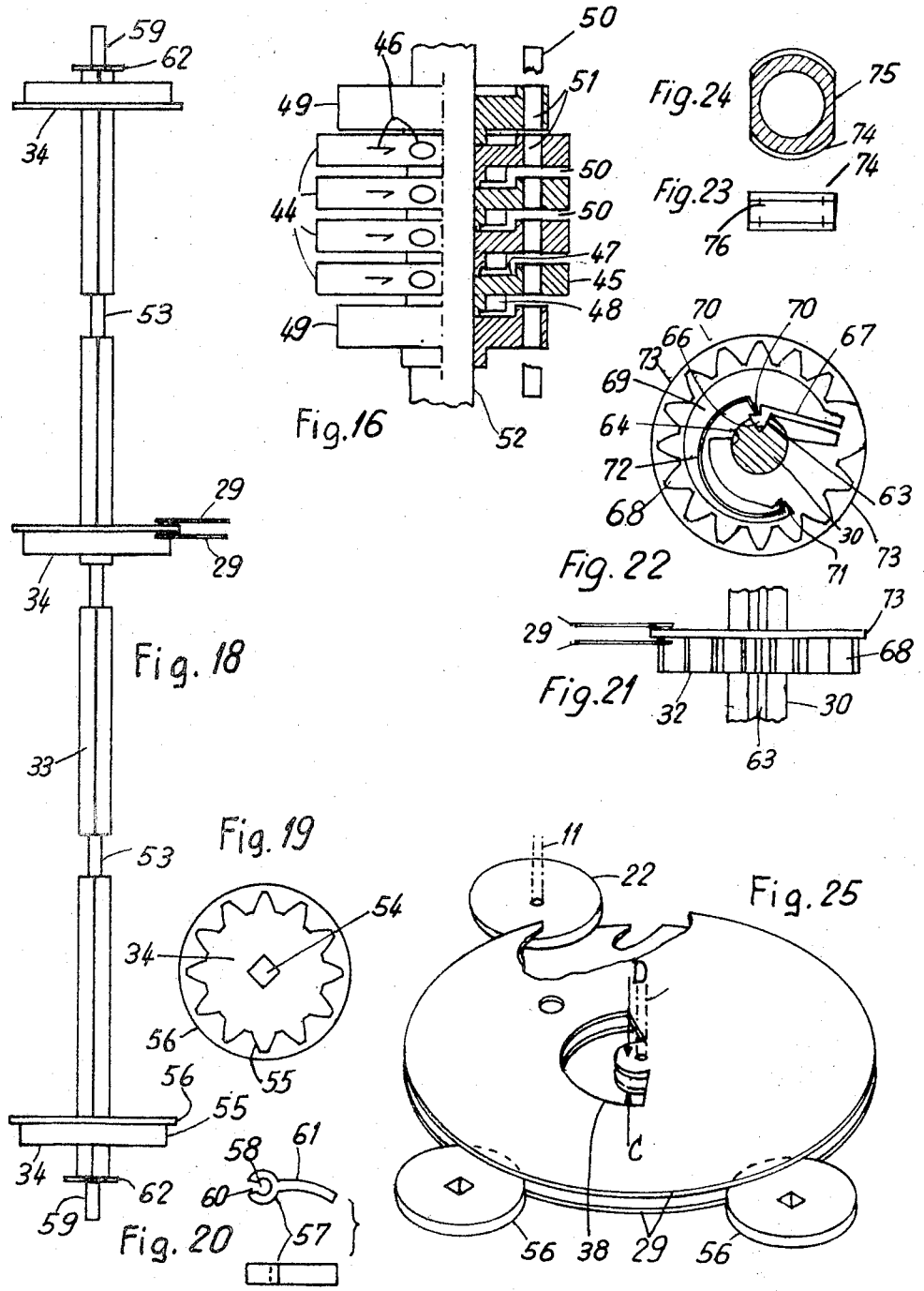

1

3,520,206
OPERATING MECHANISM FOR INDICATING WHEELS AND TYPE WHEELS IN PRICE COMPUTING WEIGHING MACHINES
Armin Wirth, Zurich, Switzerland, assignor to Wirth, Gallo & Co., Zurich, Switzerland
Filed Oct. 8, 1968, Ser. No. 765,882
Claims priority, application Switzerland, Apr. 23, 1968, 6,215/68
Int. Cl. F16h 1/12; G06
U.S. Cl. 74—421    15 Claims

ABSTRACT OF THE DISCLOSURE

An operating mechanism for indicating wheels and type wheels in price computing weighing machines. The mechanism is more compact and requires less driving power due to the fact that the intermediate gears which drive indicating wheels and type wheels have a thickness between $\frac{1}{150}$ and $\frac{1}{300}$ of their diameter.

---

Figure 11:
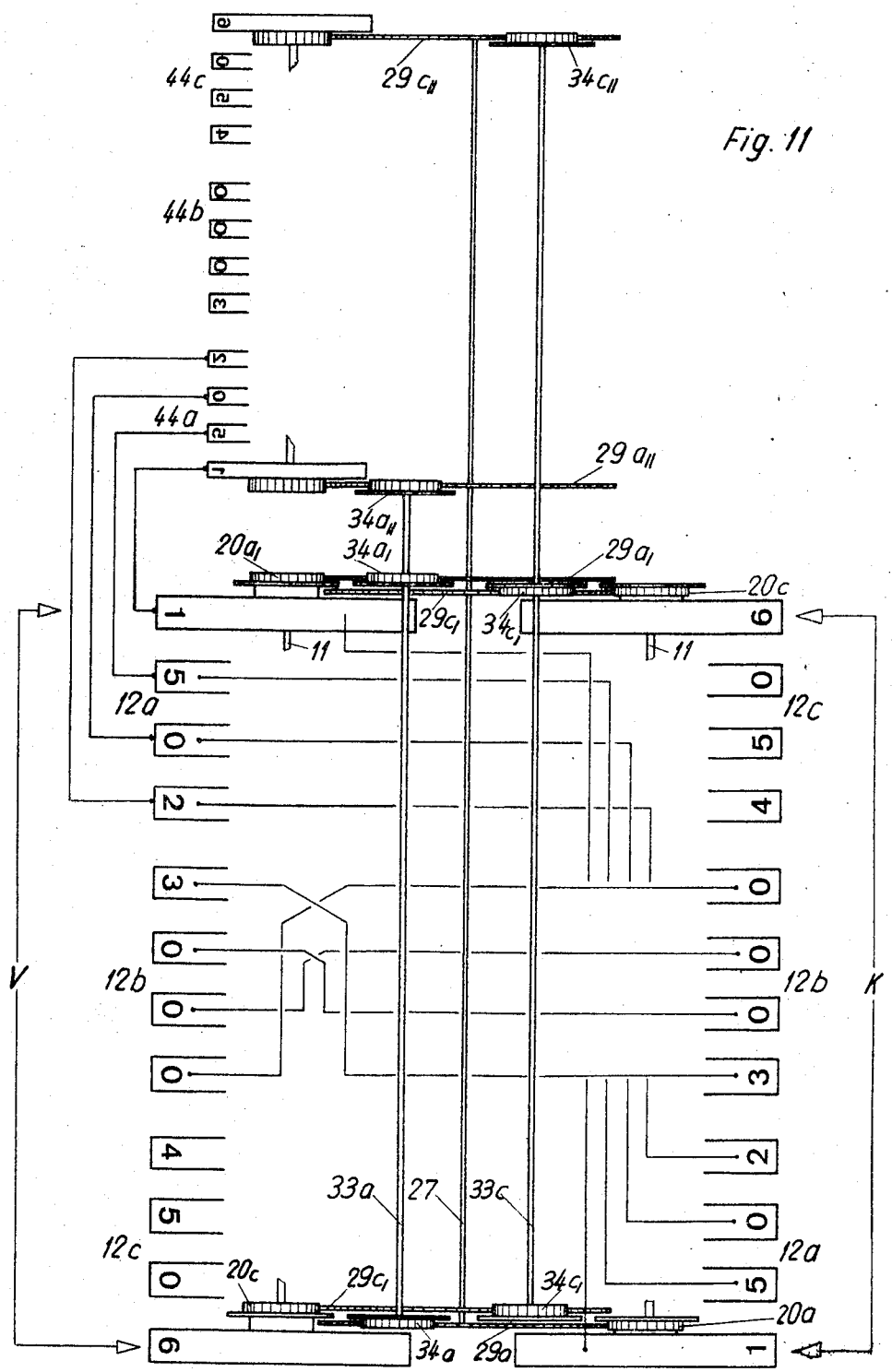

The present invention relates to an operating mechanism for the indicating wheels and type wheels in price computing weighing machines which on both sides of the machine display and print input quantities, measured quantities and computed quantities, such as the price per unit, the weight of the goods and the price to be paid, and in which each indicating wheel of groups of indicating wheels for display on one side of the machine is driven by a drive wheel mounted on a drive shaft through an intermediate gear wheel, whereas each indicating wheel of the groups of indicating wheels for display on the other side of the machine as well as the type wheels are driven by the intermediate gear wheels and further transmission wheels and shafts.

Operating mechanisms have been proposed in which, without the use of hollow shafts, rotation of the drive wheel for each digit is divided between two or three shafts each for operating the indicating wheels and type wheels of a group. These indicating wheels and type wheels are provided with driven gear wheels which have a peripheral circle that is substantially smaller than the cylinder of the indicating or type wheels carrying the digits (i.e., they are not wheels in which the digits are borne on the enlarged head of a gear wheel).

Cash registers which are equipped with such operating mechanisms are already known which comprise three groups each for displaying four or five digit numbers, namely one group each for display to the salesman, for display for the customer and for printing. In other words, each digit of the number that is to be indicated requires the provision of three synchronously working wheels bearing digits (viz 2 indicating wheels and 1 type wheel). This corresponds to a total of twelve to fifteen digit bearing wheels comprising a maximum of five wheels in a row. The indicating elements are relatively large in size. The spacing of the indicated digits is considerable and the power required for effecting the indication is high. This does not greatly matter in the cast of a cash register because a high power motor must be provided in any case for other purposes (such as the opening and closing of the cash drawer and the production of the print).

These known operating and printing mechanisms are

2 unsuitable for price computing and printing weighing machines for reasons of space alone, since three times four digits—including the intervals between the groups—i.e., fifteen digits—are indicated in a row and as many digits again must be provided alongside for printing. The length, cross section and power requirements of such an arrangement would be excessive.

It is therefore the object of the present invention to develop operating mechanism which is much more compact, and which will adjust itself relatively quickly. Another important feature contemplated by the invention is to reduce the driving power required to a minimum.

Another object of the invention is to provide an operating mechanism for groups of indicating wheels and type wheels in price computing weighing machines which display on both sides and print input quantities, measured quantities and computed quantities, comprising a first group of indicating wheels for display on the one side of the machine, a drive shaft with drive wheels each driving one of said indicating wheels through an intermediate gear wheel, a second group of indicating wheels for display on the other side of the machine, a group of type wheels, transmission shafts with transmission wheels, further intermediate gear wheels, said second group of indicating wheels and said group of type wheels being driven by said further intermediate gear wheels through said transmission shafts with transmission wheel, further shafts fixedly mounted on which said intermediate gear wheels are rotatably mounted, said intermediate gear wheels, having a thickness between $\frac{1}{150}$ to $\frac{1}{300}$ of their diameter.

An embodiment of the invention is schematically illustrated in the accompanying drawings in which:

FIG. 1 is a simplified perspective drawing of the operating mechanism according to the invention, FIG. 2 is an end-on view showing a platen partly broken away, FIGS. 3 and 4 are fixing elements, FIGS. 5 to 9 show an indicating wheel and its components, FIG. 10 is an assembly of groups of indicating wheels, FIG. 11 schematically illustrates the kinematic cooperation of different elements, FIG. 12 is a group of assembled intermediate wheels, FIGS. 13–15 are spacing elements, FIG. 16 is a group of type wheels, partly in section, FIG. 17 is an assembly of type wheels, FIG. 18 is a transmission shaft, FIG. 19 is a view of a transmission wheel, FIG. 20 is a bearing element, FIGS. 21, 22 illustrate a drive wheel, FIGS. 23, 24 show a bearing bush for the drive shaft, and FIG. 25 is a schematic representation of the manner of mounting two intermediate gear wheels.

The illustrated operating mechanism comprises three groups of pairs of indicating wheels (one each for the salesman and for the customer) and three groups of type wheels for printing.

FIG. 1 is a perspective view of the entire mechanism. Only one complete set of the three groups of four indicating wheels 12a, 12c for each side of the machine is actually shown in the drawing between the two platens 1a and 1b, the platens 1b to 1c being shown spaced closely together in simplified form and the intervening indicating wheels omitted. The three groups of type wheels 44 are mounted between the last two platens 1e and 1f. These platens are held together by tubular spacing members 2 and four tiebolts 3. The side facing the salesman is marked V and that facing the customer K.

The platens 1a to 1f are provided with radial slots in which shafts are mounted. In FIG. 1 only the shafts 11 in the slots 9 and 10 are shown, these shafts being held in position by resilient retaining members 13 (FIG. 3). The shafts 11 carry the indicating wheels 12, which can rotate freely.

FIGS. 5 to 9 illustrate a single indicating wheel 12. This comprises a cylindrical rim 14 and a hub 15 with a square section bore. An insertion 17 fits into this bore 16 and comprises two like square section ends 18, a cylindrical centre section 19 and rim of gear teeth 20. Moreover, a circular disc 22 is mounted on one side of the centre section 19. The insertion 17 is also provided with a round bore 23 for the reception of the shaft 11. It will be understood from FIGS. 6 to 8 that the insertion 17 can be inserted into the hub 15 in different ways (as indicated in FIGS. 7 and 8). However, in each case a gap remains between the hub 15 and the disc 22 equal in width to the thickness of the cylindrical section 19 or of the rim of gear teeth 20.

FIG. 10 shows a shaft 11 on which groups of indicating wheels 12 have been assembled. In order to simplify alignment during assembly each of the indicating wheels 12a, b, c is provided with a hole 24 (FIG. 5) through which a rod 25 is insertable to permit the indicating wheels 12a, b, c to be mounted in the slots 9 and 10 of the platen in correct alignment.

FIG. 2 is an end view of the operating mechanism showing one of the platens 1a to 1f partly broken away and further elements inserted which are omitted in FIG. 1 for the sake of simplicity. The slot 26 contains a shaft 27 which is held in position by a resilient retaining element 28 (FIG. 4). The shaft 27 is thus fixed and carries thin freely rotatable intermediate gear wheels 29 which mesh with the rim of gear teeth 20 of the associated indicating wheel 12 as well as with a drive wheel 32 on a drive shaft 30 which is mounted in a bottom slot 31. Moreover, the other slots serve for mounting transmission shafts 33 which carry transmission wheels 34 that are fixed on these shafts.

FIG. 11 is a schematic plan of the cooperation of indicating wheels, intermediate gear wheels and type wheels, via the transmission wheels on the transmission shafts. Three groups of indicating wheels face the salesman at V, for instance 12a (weight), 12b (unit price), 12c (price). Three similar groups 12a to 12c correspond to these groups on the side K facing the customer, preferably arranged in the same sequence when viewed by the customer as that in which they are seen by the salesman.

On the salesman's side V are three groups of type wheels for the above-mentioned quantities, namely 44a (weight), 44b (unit price), 44c (price), in mirror reverse.

Lines drawn between the wheels of the groups, for instance 11a (V)–12a (K)–44a exemplify the required cooperation. In the case of two cooperating sets the cooperating gear wheels and shafts are shown and one of these cross connections will be hereinafter described.

For the digit "1" in the three groups a, starting from the customer's side K, gear wheel 20a in group 12a, indicating wheel in position "1," meshes with the intermediate gear wheel 29a which is freely rotatable on the centre shaft 27. This intermediate gear wheel 29a meshes with a transmission wheel 34a which is fixed on the transmission shaft 33a. Likewise fixed on the transmission shaft 33a are two further transmission wheels 34a' and 34a" which mesh with intermediate gear wheels 29a' and 29a" respectively.

The intermediate gear wheel 29a' meshes with gear wheel 20a of the indicating wheel 12a in position "1," whereas the intermediate gear wheel 29a" meshes with the type wheel 44a in position "1."

Analogously the wheels in group c, position 6, can be traced out in the diagram.

Entire wheel assemblies on the several shafts can be mounted and removed by inserting and removing the shafts into and from the slots in the platens. Apart from the first shaft 27 they can be thus mounted and removed in any desired sequence.

Masks 35 (FIG. 2) cover the assemblies of indicating wheels in such a way that only the indicated digit is visible.

FIG. 12 shows a preassembled set of intermediate gear wheels 29 on a shaft 27. The spacing of the intermediate gear wheels 29 and their spacing from the end plates is determined in the indicating part of the operating mechanism by comb-like spacing members 36 (FIGS. 13, 14). These spacing members 36 have slots 37 for the location each of two intermediate gear wheels 29. As will be later described the intermediate gear wheels 29 merely perform forward and back rotations within an angle of about 60°. They have sector-shaped windows 38 through which the spacing members 36 are insertable and which then permit the wheels 29 to perform rotations within the required angular range. Moreover, the intermediate gear wheels 29 may likewise be provided with a hole 39 for the insertion therethrough of a rod 40 for aligning the wheels during assembly. These intermediate gear wheels 29 are very thin discs. Preferably their thickness should not exceed $\frac{1}{150}$ to $\frac{1}{300}$ of their diameter, say 0.2 to 0.4 mm. The diameter of their central bore should be about $\frac{1}{25}$ to $\frac{1}{40}$ of the diameter of the disc. Such wheels can be produced for instance by stamping them out of an aluminum blank and anodizing the same.

FIG. 15 is a spacing element 42 resembling the element 36, but having slots 43 adapted for the location of only one intermediate gear wheel 29a in the transmission to the type wheels. The spacing members 36 and 42 are preferably made of an injected moulded plastics and they are provided with a longitudinal V-shaped slot 41 for clipping them on to the shaft 27.

FIG. 16 is a part sectional view of a group of four type wheels 44. On their peripheral surfaces 45 the type wheels carry type faces 46 in relief. A rim of gear teeth 48 from the neighbouring type wheel projects into an inner recess 47 of each type wheel 44. At the ends of the group of type wheels correspondingly shaped spacing wheels 49 of smaller diameter are provided. As will be later described the intermediate gear wheels 29 mesh with the geared rims 48. The edges of the intermediate gear wheels 29 are guided in the gap 50 between two type wheels 44. Moreover, the type wheels 44 are provided with holes 51 for conveniently aligning them by means of an inserted rod 50 during assembly. The shaft 52 (FIG. 17) of the type wheels 44 is mounted in axial alignment with the shaft 11 of one of the indicating wheels, for instance on the side V facing the salesman (FIGS. 1 and 11).

FIG. 18 shows one of the transmission shafts 33 and three transmission wheels 34 mounted thereon. This transmission shaft 33 is a square section shaft with cylindrical reduced sections 53, and cylindrical journals 59 at each end. The square section portions carry three transmission wheels 34 which have corresponding square section bores 54 (FIG. 19). The axial distance between these transmission wheels 34 depends upon the axial length of the desired transmission (cf. FIG. 11). Each transmission wheel 34 consists of a gear wheel 55 integral with a collar 56 of at least the same diameter as the gear wheel.

For mounting these transmission shafts 33 in the platens plastics bearing bushes 57 (FIG. 20) are provided. The bearing 58 only partly embraces one of the cylindrical portions 53 or 59 of the transmission shaft 33, for instance with an envelopment angle of 120° to 140°. The slot 60 elastically yields when the bush is clipped over the cylindrical parts 53 or 59 of the shaft. The arched extension 61 is nearly straightened during insertion into the slot in the platen and it will then be held in the slot 4 by virtue of its elastic stress (FIGS. 1 and 2). Discs 62 at the ends of the transmission shaft 33 form thrust bearings.

FIGS. 21–22 illustrate the location and functions of the drive wheel 32 on the drive shaft 30. The drive shaft 30 is provided throughout its length with an axial V-shaped groove 63. The drive wheels 32 which are preferably of plastics construction have an internal hub 69 which embraces only part of the bearing surface 64 of the shaft. A projection 66 connected by a resilient arm 67 to the rim of gear teeth 68 of the drive wheel 32 engages the groove 63 in the shaft 30. A spring 72 is interposed between a notch 70 in the projection 66 and a notch 71 in the internal recess 69 in the wheel, and this spring operates to retain the projection 66 in engagement with the groove 63. Since the drive wheels 32 rotate within an angle not exceeding 240° the gear rim 68 does not have teeth around its entire periphery. Adjacent its rim of gear teeth 68 the drive wheel 32 has a collar 73 which is located between two intermediate gear wheels 29 and which thereby locates the drive wheel 32 in the axial direction.

The indicating wheels 12 and the type wheels 44 are set as follows: The starting position is for instance an empty space on the indicating wheels preceding the "zero" digit. The drive shaft 30 rotates in clockwise direction. First all the wheels of the entire mechanism participate in this rotation (in the direction from "zero" to "nine"). Each indicating position is associated with an arresting means which is of conventional kind and therefore not shown. This arresting means is adapted to arrest the wheels associated with one digit. The arresting means may be arranged to cooperate either directly with the indicating wheels or type wheels or with the intermediate or drive wheels. The drive shaft 30 is capable of rotating because of the construction of the drive wheels 32 illustrated in FIG. 22, when the set of indicating wheels for one digit has been arrested, since the projection 66 can radially yield.

In the final position of the drive shaft 30 (corresponding to digit "nine") all the values that are to be indicated are set. If the indication is to be cleared the drive shaft 30 rotates in counterclockwise direction. The projection 66 reengages the groove 63 and the entire assembly of wheels is driven and turns back into starting position. The means required for controlling the drive shaft 30 are likewise of conventional kind and not shown.

FIGS. 23 and 24 illustrate a bearing bush 74 made for instance of synthetic plastics or sinter metal, for supporting the drive shaft 30 in the platens. The bush is cylindrical with lateral flats 75, the cylindrical portion containing slots 76. This bush is insertable into the elongated part of the slot 31 (FIGS. 1 and 2) and then rotated through 90° in the round part of the slot 31 for locating the same. The drive shaft 30 and all the drive wheels 32 can therefore be preassembled and inserted into the platens as a unit.

FIG. 25 schematically illustrates the manner in which the paired intermediate gear wheels 29 are located. The collars of transmission wheels 34 not shown project between two intermediate gear wheels 29 in two places, whereas the disc 22 on an indicating wheel 12 projects between the intermediate gear wheels 29 at a third point. The transmission wheels 34 and their collars 56 are axially fixed. The disc 22 merely determines the minimum spacing of the intermediate gear wheels 29. However, in the centre of the intermediate gear wheels 29 the maximum spacing of these wheels is determined by the gaps 37 in the spacing members 36 (indicated by arrows C and D). Thus the plane in which the intermediate wheel 29 can rotate is exactly defined.

The disc 22 of the second indicating wheel and the collar 73 of the drive wheel 30 are not shown for the sake of greater clarity. However, owing to their slidability on their shafts these two elements (22, 73) likewise adjust themselves without constraint to the position of a pair of intermediate wheels. The guidance afforded in their plane of rotation to the intermediate wheels 29 which drive the type wheels 44 is not specially shown because this involves no special features.

The edge of the extremely thin intermediate gear wheels 29 is incidentally sufficiently flexible and is therefore able to bridge manufacturing and assembly tolerations in the direction of the shaft axes.

I claim:

1. An operating mechanism for groups of indicating wheels and type wheels in price computing weighing machines which display on both sides and print input quantities, measured quantities and computed quantities, comprising a first group of indicating wheels for display on one side of the machine, a drive shaft with drive wheels each driving one of said indicating wheels through an intermediate gear wheel, a second group of indicating wheels for display on the other side of the machine, a group of type wheels, transmission shafts with transmission wheels, further intermediate gear wheels, said second group of indicating wheels and said group of type wheels being driven by said further intermediate gear wheels, through said transmission shafts with transmission wheels further shafts fixedly mounted on which said intermediate gear wheels are rotatably mounted, said intermediate gear wheels having a thickness between $\frac{1}{150}$ to $\frac{1}{300}$ of their diameter.

2. An operating mechanism according to claim 1, in which each of said indicating wheels has a removable inner portion which comprises a rim of gear teeth and a guide disc.

3. An operating mechanism according to claim 2, in which comb-shaped spacing elements having slots are attached to said shafts of said intermediate gear wheels.

4. An operating mechanism according to claim 3, in which said transmission wheels are fixedly mounted on rotatable shafts and comprise a rim of gear teeth and a collar of at least the same diameter as said rim of gear teeth.

5. An operating mechanism according to claim 4, in which said intermediate gear wheels are located and guided internally by slots of said spacing members and peripherally, on the one hand, by said collars of said transmission wheels and, on the other hand, by said guide discs of neighbouring indicating wheels.

6. An operating mechanism according to claim 5, in which said type wheels have a rim of gear teeth on one side and a recess on the other side into which a rim of a gear teeth of the neighbouring type wheel projects.

7. An operating mechanism according to claim 6, in which said intermediate gear wheels mesh with said rims of said gear teeth and are guided in the gap between two neighbouring type wheels.

8. An operating mechanism according to claim 7, in which each group of said indicating wheels which display their indications on the same side of the machine is associated with a drive shaft and each of said type wheels with one of said drive wheels.

9. An operating mechanism according to claim 8, in which said drive shaft has a longitudinal groove.

10. An operating mechanism according to claim 9, in which each of said drive wheels has a rim of gear teeth, a collar of a diameter at least equal to that of the rim of gear teeth, an inner recess, a hub which projects into said recess, and which embraces only part of the periphery of said drive shaft, a resilient arm with a projection engageable with said longitudinal groove in said drive shaft and a spring which biases said projection into engagement with said longitudinal groove.

11. An operating mechanism according to claim 10, in which edges of said collars of said drive wheels operate as spacing members between the edges of neighbouring intermediate gear wheels.

12. An operating mechanism according to claim 11, in which all said indicating wheels displaying their indications on one side of the machine are freely rotatably mounted on a common shaft, said shaft together with its indicating wheels forms an assembly which can be inserted and removed as a unit.

13. An operating mechanism according to claim 12, in which all said type wheels are freely rotatably mounted on a common shaft, said shaft together with the type wheels forms an assembly which can be inserted and removed as a unit.

14. An operating mechanism according to claim 13, in which all said intermediate gear wheels and their shaft form an assembly which can be inserted and removed as a unit.

15. An operating mechanism according to claim 14, in which each of said transmission shafts and said associated transmission wheels mounted on said shafts form an assembly which can be inserted and removed as a unit.

References Cited

UNITED STATES PATENTS

| | | |
|---|---|---|
| 1,094,638 | 4/1914 | Boyer et al. |
| 2,177,611 | 10/1939 | McLaren. |
| 3,209,998 | 10/1965 | Worst. |

LEONARD H. GERIN, Primary Examiner

U.S. Cl. X.R.

235—61